(12) United States Patent
Mazotti et al.

(10) Patent No.: US 6,985,668 B2
(45) Date of Patent: Jan. 10, 2006

(54) MULTI-PURPOSE OPTICAL LIGHT PIPE

(75) Inventors: William Paul Mazotti, San Martin, CA (US); Brian Scott Huss, Appleton, WI (US)

(73) Assignee: National Semiconductor Corporation, Santa Clara, CA (US)

( * ) Notice: Subject to any disclaimer, the term of this patent is extended or adjusted under 35 U.S.C. 154(b) by 34 days.

(21) Appl. No.: 10/621,033

(22) Filed: Jul. 15, 2003

(65) Prior Publication Data

US 2005/0013581 A1    Jan. 20, 2005

(51) Int. Cl.
    *G02B 6/10* (2006.01)
(52) U.S. Cl. ......................................... 385/146; 385/94
(58) Field of Classification Search ............ 385/88–94, 385/146, 139
    See application file for complete search history.

(56) References Cited

U.S. PATENT DOCUMENTS

| | | | |
|---|---|---|---|
| 5,011,246 A | | 4/1991 | Corradetti et al. |
| 5,019,673 A | | 5/1991 | Juskey et al. |
| 5,054,870 A | | 10/1991 | Losch et al. |
| 5,076,688 A | * | 12/1991 | Bowen et al. .............. 356/73.1 |
| 5,139,969 A | | 8/1992 | Mori |
| 5,208,879 A | | 5/1993 | Gallo et al. |
| 5,349,317 A | | 9/1994 | Notani et al. |
| 5,352,926 A | | 10/1994 | Andrews |
| 5,487,124 A | | 1/1996 | Bowen et al. |
| 5,487,127 A | | 1/1996 | Gronet et al. |
| 5,515,467 A | | 5/1996 | Webb |
| 5,521,992 A | | 5/1996 | Chun et al. |
| 5,579,208 A | | 11/1996 | Honda et al. |
| 5,590,232 A | | 12/1996 | Wentworth et al. |
| 5,608,262 A | | 3/1997 | Degani et al. |
| 5,621,837 A | | 4/1997 | Yamada et al. |
| 5,723,369 A | | 3/1998 | Barber |
| 5,726,079 A | | 3/1998 | Johnson |
| 5,744,827 A | | 4/1998 | Jeong et al. |
| 5,774,616 A | | 6/1998 | Matsuda |
| 5,780,875 A | | 7/1998 | Tsuji et al. |
| 5,790,384 A | | 8/1998 | Ahmad et al. |
| 5,798,567 A | | 8/1998 | Kelly et al. |

(Continued)

FOREIGN PATENT DOCUMENTS

JP        60-202959        10/1985

(Continued)

OTHER PUBLICATIONS

Nguyen et al., "Techniques for Attaching Rotated Photonic Devices to an Optical Sub-Assembly in an Optoelectronic Package," U.S. Appl. No. 10/165,458, filed Jun. 6, 2002, 31 Pages.

(Continued)

*Primary Examiner*—Juliana Kang
(74) *Attorney, Agent, or Firm*—Beyer Weaver & Thomas, LLP (57) ABSTRACT

A plug device for use during manufacturing and/or testing processes for optoelectronic (OE) devices is described. The plug device has a handle and structures that extend off of the handle to cover "barrels" of an OE device. The plug device prevents contaminating particulates from reacting the lenses and/or the photonic devices within the OE device. The plug device can also be made of a material that transmits light signals so that testing of the OE devices can be easily performed. The plug device can also have a surface to which a pick and place machine can attach itself so that the plug device and a respective optoelectronic device can be easily transported. Overall, the plug device can simplify both the manufacturing and testing processes for OE devices.

31 Claims, 3 Drawing Sheets

U.S. PATENT DOCUMENTS

| | | | |
|---|---|---|---|
| 5,821,615 | A | 10/1998 | Lee |
| 5,864,642 | A | 1/1999 | Chun et al. |
| 5,949,135 | A | 9/1999 | Washida et al. |
| 6,027,254 | A | 2/2000 | Yamada et al. |
| 6,030,246 | A * | 2/2000 | Kunishi ............... 439/329 |
| 6,043,430 | A | 3/2000 | Chun |
| 6,054,759 | A | 4/2000 | Nakamura |
| 6,075,284 | A | 6/2000 | Choi et al. |
| 6,201,704 | B1 | 3/2001 | Poplawski et al. |
| 6,236,109 | B1 | 5/2001 | Hsuan et al. |
| 6,258,630 | B1 | 7/2001 | Kawahara |
| 6,281,568 | B1 | 8/2001 | Glenn et al. |
| 6,305,848 | B1 | 10/2001 | Gregory |
| 6,316,837 | B1 | 11/2001 | Song |
| 6,316,838 | B1 | 11/2001 | Ozawa et al. |
| 6,318,902 | B1 | 11/2001 | Igl et al. |
| 6,318,909 | B1 | 11/2001 | Giboney et al. |
| 6,364,542 | B1 | 4/2002 | Deane et al. |
| 6,450,704 | B1 | 9/2002 | O'Connor et al. |
| 6,497,518 | B1 | 12/2002 | Deane |
| 6,595,699 | B1 | 7/2003 | Nguyen et al. |
| 6,599,033 | B1 * | 7/2003 | Pohnke ............... 385/94 |
| 6,624,504 | B1 | 9/2003 | Nguyen et al. |
| 6,635,866 | B2 | 10/2003 | Chan et al. |
| 6,655,854 | B1 | 12/2003 | Nguyen et al. |
| 6,707,140 | B1 | 3/2004 | Nguyen et al. |
| 2001/0013645 | A1 | 8/2001 | King et al. |
| 2001/0048151 | A1 | 12/2001 | Chun |
| 2002/0136502 | A1 * | 9/2002 | Bachl et al. ............... 385/88 |
| 2003/0026081 | A1 | 2/2003 | Liu et al. |
| 2003/0026556 | A1 | 2/2003 | Liu et al. |
| 2004/0091208 | A1 * | 5/2004 | Doi ............... 385/31 |

FOREIGN PATENT DOCUMENTS

JP    08125066    5/1996

OTHER PUBLICATIONS

S. Savastiouk, PH.D., et al. "3-D stacked wafer-level packaging", Mar. 2000, *Advanced Packaging*, pp. 28-34.

National Semiconductor, "Packaging Databook", *1993 National Semiconductor*, pp. v-xi to 1-3 to 1-4, 3-1 to 3-20, 3-30 to 3-31, 3-62 to 3-69. Please note: The year of publication is sufficiently earlier than the effective U.S. filing date so that the particular month of publication is not in issue.

* cited by examiner

MULTI-PURPOSE OPTICAL LIGHT PIPE

CROSS-REFERENCE TO RELATED APPLICATIONS

This application is related to U.S. Pat. No. 6,364,542, entitled "DEVICE AND METHOD FOR PROVIDING A TRUE SEMICONDUCTOR DIE TO EXTERNAL FIBER OPTIC CABLE CONNECTION," to U.S. patent application Ser. No. 09/568,558, entitled "ARRAYABLE, SCALABLE AND STACKABLE MOLDED PACKAGE CONFIGURATION," filed on May 9, 2000, to U.S. Pat. No. 6,497,518, entitled "MINIATURE OPTO-ELECTRIC TRANSCEIVER," to U.S. patent application Ser. No. 09/922,358, entitled "MINIATURE SEMICONDUCTOR PACKAGE FOR OPTOELECTRONIC DEVICES," filed on Aug. 3, 2001, to U.S. patent application Ser. No. 10/165,553, entitled "OPTICAL SUB-ASSEMBLY FOR OPTO-ELECTRONIC MODULES," filed on Jun. 5, 2002, and to U.S. patent application Ser. No. 10/165,711, entitled "CERAMIC OPTICAL SUB-ASSEMBLY FOR OPTO-ELECTRONIC MODULES," filed on Jun. 5, 2002, to U.S. patent application Ser. No. 10/165,548, entitled "TECHNIQUES FOR ATTACHING ROTATED PHOTONIC DEVICES TO AN OPTICAL SUB-ASSEMBLY IN AN OPTELECTRONIC PACKAGE," the content of each of which are hereby incorporated by reference.

FIELD OF THE INVENTION

The present invention relates generally to optoelectronic devices, and more specifically to plug devices that are useful during the manufacturing and/or testing stages of optoelectronic devices.

BACKGROUND OF THE INVENTION

Manufacturing processes for assembly of optoelectronic devices most often includes operations which require soldering (by way of wave, reflow, or manual techniques). In some cases these operations involve flux and/or aggressive post-solder rinsing at elevated temperatures (e.g., greater than 100 degrees F.). Particulates and wash residues can get trapped within "barrels" that lead to lenses and/or the active emitting and transmitting devices of an optical subassembly. For example, see the barrels 112 of FIG. 1. Depending on the degree of contamination, a secondary operation to post-clean the lenses is used; however, this additional process is time consuming, costly and not always effective. The result of contamination on lenses result in a photons within the modulated light signal becoming deflected off desired optical path. This problem is detrimental on transmit and receive lenses. The module performance impact as a result of lens contamination manifests itself in signal integrity issues including but not limited to jitter and signal latency processing due to modal distortion.

As is typical, most manufacturing processes are accompanied by test process. Optical module test costs can be as high as 20% for multi-mode communication modules and as high as 50% for single-mode modules. Very expensive test systems are employed with fixturing that allows a module to be exercised against it's performance specification and beyond (usually 15%–20%) test margin for critical parameters. Depending on data rate, systems can cost upwards to $1M for a gigabit tester and as high as $5M for a parallel 3 Gbps tester. The test system approach is to duplicate module transmit and receive stimulus and then measure the response. Both stimulus and response sensors must behave optically. Specifically, there must be a light source for the target wavelength and a corresponding light detector. In order to test a single module, the test system should have this capability along with all the required power sources, switches, and bit error rate test modules. In many cases it is desirable to test a full loop using two modules. This is more for characterization of an optical link in addition to interoperability with competitor modules. In either case, there is manual intervention by operators to insert and remove modules. This setup is a non-value added delay and introduces additional risk of module handling including but not limited to potential electro-static discharge (ESD) induced failures.

In view of the foregoing, an apparatus for limiting the amount of contamination to optical components and for facilitating the testing process of an optical device would be desirable.

BRIEF SUMMARY OF THE INVENTION

The present invention pertains to a plug device for use during manufacturing and/or testing processes for optoelectronic (OE) devices. The plug device has a handle and structures that extend off of the handle to cover "barrels" of an OE device. The plug device prevents contaminating particulates from reacting the lenses and/or the photonic devices within the OE device. The plug device can also be made of a material that transmits light signals so that testing of the OE devices can be easily performed. Overall, the plug device can simplify both the manufacturing and testing processes for OE devices.

One embodiment of the plug device includes a handle having a first end and a second end, and a pair of rods wherein one of the rods extends from the first end of the handle and the other rod extends from the second end of the handle, wherein each of the rods is suitably sized to fit into respective barrels that lead to photonic devices such that each rod seals respective openings of the barrels and thereby prevents contaminating particles from entering each barrel.

Another embodiment of the plug device includes a handle having a first end and a second end, and a pair of rods wherein one of the rods extends from the first end of the handle and the other rod extends from the second end of the handle, wherein each of the rods is suitably sized to fit into respective barrels that lead to photonic devices, and wherein each of the rods are made of a material capable of transmitting optical light signals such that light entering a distal end of one of the rods can be transmitted through the handle and to a distal end of the other rod.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention pertains to a plug device for use during manufacturing and/or testing processes for optoelectronic (OE) devices. The plug device has a handle and structures that extend off of the handle to cover "barrels" of an OE device. The plug device prevents contaminating particulates from reacting the lenses and/or the photonic devices within the OE device. The plug device can also be made of a material that transmits light signals so that testing of the OE devices can be easily performed. Overall, the plug device can simplify both the manufacturing and testing processes for OE devices.

Figure 1:
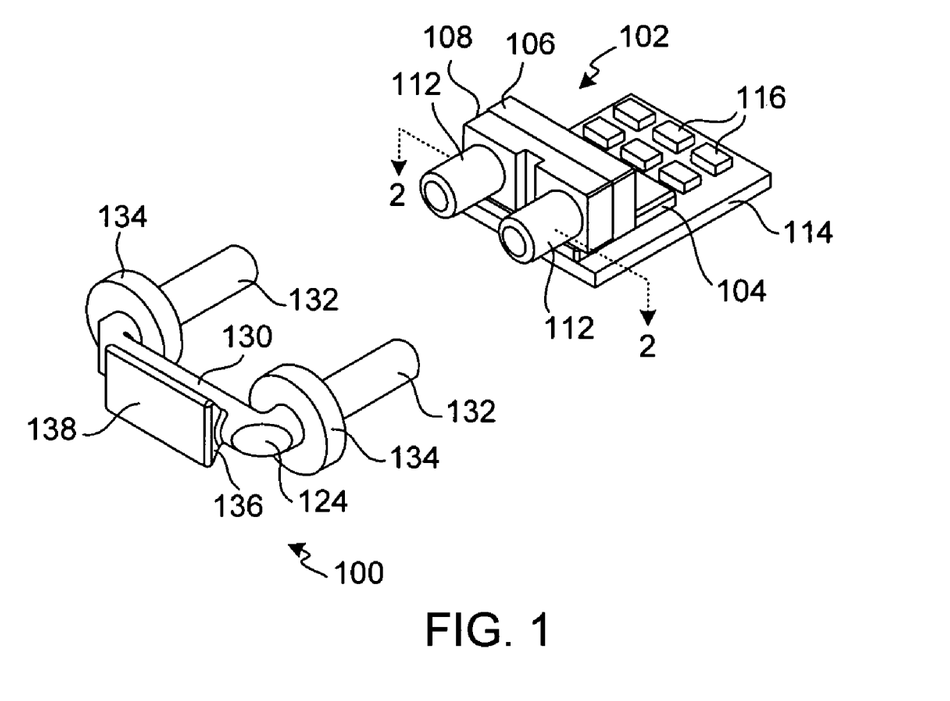
FIG. 1 illustrates a perspective view of a plug device that is suitable for insertion into an optoelectronic device, according to one embodiment of the invention.
Figure 2:
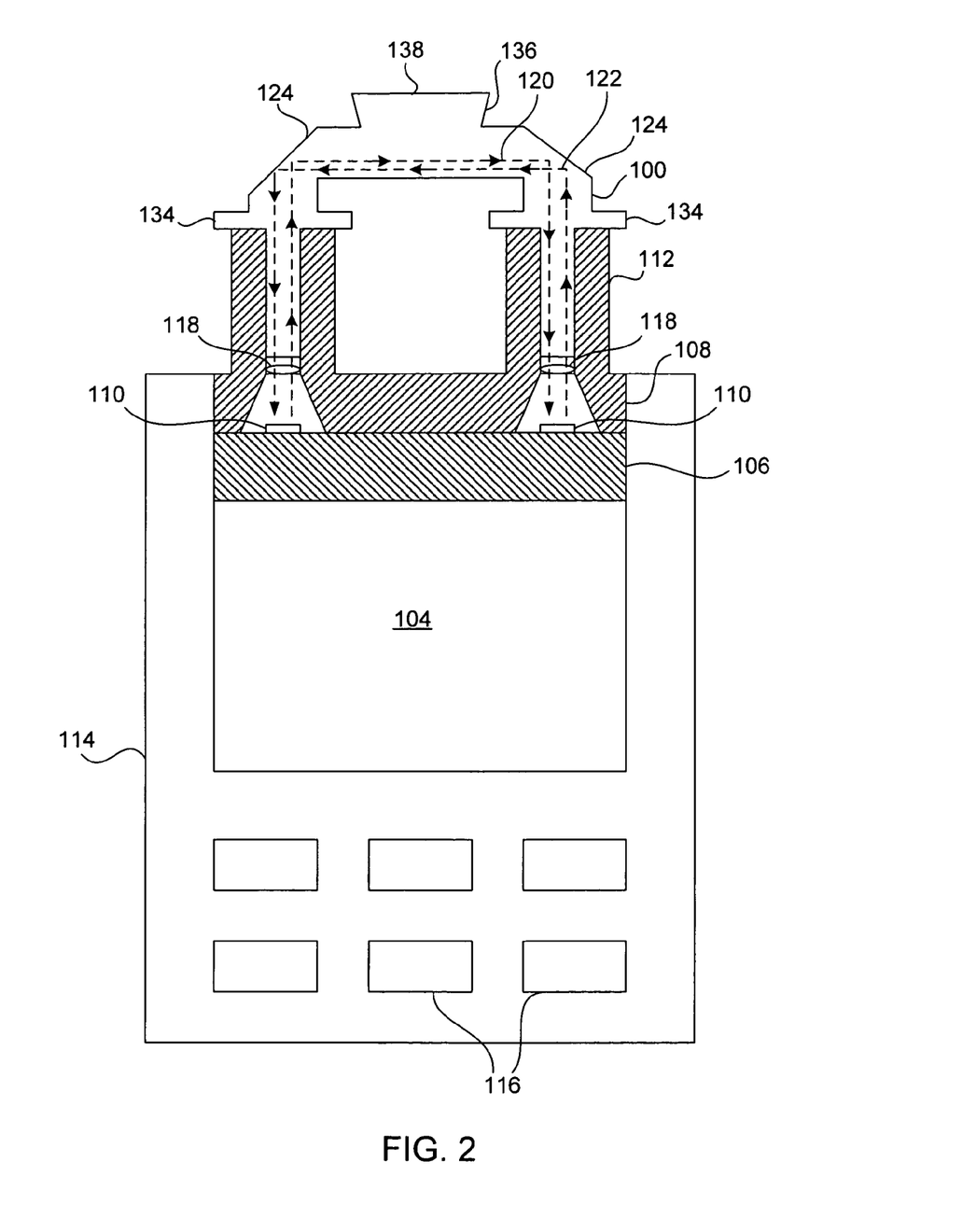
FIG. 2 illustrates a cross-sectional view of the optoelectronic device of FIG. 1 with the inserted plug device along line 2—2 of FIG. 1.

FIG. 1 illustrates a perspective view of a plug device 100 that is suitable for insertion into optoelectronic device 102, according to one embodiment of the invention. FIG. 2 illustrates a cross-sectional view of optoelectronic device 102 with the inserted plug device 100, along line 2—2 of FIG. 1. Optoelectronic (OE) device 102 is a combinational device that includes both an optical component and an electronic component and can be used to send, receive, and manipulate optical and electrical signals. Specifically, OE device 102 includes a semiconductor chip package 104, which supports a support block 106 and a barrel unit 108. Barrel unit 108 covers photonic devices 110 that are mounted onto a side surface of support block 106. As shown in FIG. 2, the cut-away of barrel unit 108 reveals photonic devices 110. Photonic devices 110 transmit and/or receive optical signals to and from optical fibers that will be inserted into barrels 112.

Plug device 100 includes a handle 130 and two rods 132, which extend from the ends of handle 130. Rods 132 are sized to fit snuggly into barrels 112. As will be described in more detail later, rods 132 can serve to protect OE device 102 from contamination and to serve as an optical signal transmission medium that is useful for testing purposes.

With respect to OE device 102, the semiconductor chip package 104 can be any type of package having a semiconductor chip that is at least partially encapsulated within a protective material, such as epoxy or resin. Chip package 104 should have electrical traces and/or contacts that allow for electrical connection with support block 106. In one embodiment, a semiconductor die within the chip package will have uplinking electrical contacts formed directly on the top surface of the die. These uplinking contacts are exposed through the top surface of chip package 104 and thereby can be connected to contact pads of support block 106. Traces on the surface or within support block 106 serve to connect chip package 104 to the photonic devices 110 that are attached to support block 106. Photonic devices 110 are attached to the front face of support block 106, which is the face upon which barrel unit 108 is attached. Electrical signals from photonic devices 110 are transmitted to and from chip package 104. The semiconductor device (or die) within chip package 104 converts, stores, and sends the signals in electronic form.

Chip package 104 is mounted on an electronic circuitry substrate 114, for instance a printed circuit board (PCB). Various electrical components 116 are also attached to substrate 114. Electrical components 116 can be used for various purposes such as power management, signal processing, and the like. Substrate 114 contains circuitry that runs on the surface and/or within the body of the substrate. Such circuitry allows OE device 102 to connect to electrical components 116 and to other electrical systems.

The hollow barrels 112 of barrel unit 108 provide access for an optical connection to a transmission medium (e.g., an optic fiber). Barrels 112 serve as the optical port to which optical transmission mediums are plugged into. As shown in FIG. 2, barrel unit 108 fits over photonic devices 110 and each barrel 112 leads to a photonic device 110. Barrel unit 108 protects photonic devices 110 and provides the structure for securing optic fibers in alignment with photonic devices 110.

Barrel unit 108 can have various shapes and sizes. In one instance, barrel unit 108 can have a large number of barrels wherein each barrel provides access to one or more photonic devices. These barrels 108 can also have various shapes to accommodate varying numbers of fibers and different shaped ferrules (not shown). Ferrules are the protective covers that secure the ends of optic fibers and are formed to connect with barrel unit 108 so that optic fibers can be properly aligned with photonic devices 110. Typically, each barrel is sized to receive one fiber and one photonic device is located underneath the opening of each barrel. Typical photonic devices have lengths and widths between 0.25–0.5 mm on a side.

In some embodiments of OE device 102, barrel unit 108 can have more than two barrels 112. For example, a barrel unit could be configured to fit over a 4× transceiver. This barrel unit would have 8 barrels wherein four barrels fit over four transmitting photonic devices, respectively, and four barrels fit over four receiving photonic devices, respectively.

Now with respect to plug device 100, it was described earlier that plug device 100 generally has a handle 130 and a pair of rods 132. Plug device 100 also has a rim 134 that extends around each rod 132 at a position near the interface of handle 130 and each rod 132. Additionally, an extension 136 is formed on handle 130 for purposes of transporting plug device 100. When plug device 100 is plugged into barrels 112 of OE device 102, OE device 102 can be transported together with plug device 100.

Rods 132 are sized to fit within barrels 112. The diameter of each rod 132 should be sized so that contact should be made between the outer surface of rods 132 and the inner surface of barrels 112. Rods 132 are useful for sealing the openings of barrels 112 such that during OE device manufacturing processes, contaminating particles are prevented from entering barrels 112. In this way, lenses 118, which are positioned at the inner end of barrels 112 can be kept free from contamination. In some embodiments, lenses 118 are not present and therefore, rods 132 can prevent contamination of photonic devices 110. In some embodiments, the diameter of rods 132 can be just large enough that rods 132 fit tightly within barrels 112. In this manner, a more hermetic seal can be created between rods 132 and barrels 112. For the purposes of sealing the openings of barrels 112, the length of rods 132 can vary between a short length that extends slightly into each barrel 112, and long length that extends all the way to each of lenses 118 within barrel unit 108. The main requirement of the length of rods 132 is that the length allows each rod 132 to properly seal the opening of a barrel 112.

In some embodiments of barrel unit 108, the opening of barrels 112 can have varying shapes such as rectangular, oval, square and the like. In such embodiments, rods 132 should also be shaped to conform with barrels 112.

Rims 134 cover the openings of barrels 112 and provide additional capability of plug device 100 to seal barrels 112. The diameter of rims 134 can range from a small diameter to a large diameter. A small diameter forms a rim 134 that spreads just barely past the inner diameter of the opening of barrels 112. A large diameter forms a rim 134 that spreads past the outer diameter of barrels 112. The diameter of barrels 112 can be determined based upon the degree to which a barrel 112 is needed to be sealed.

In some embodiments, rims 134 are not required since rods 132 can properly seal the openings of barrels 112. In other words, rims 134 are optional.

Plug device 100 can also be used to test the performance of OE devices when plug device 100 is made out of a material capable of transmitting optical light signals. For instance, plug device can be made out of transparent or translucent materials. Some exemplary materials are liquid crystal polymer (LCP), acrylic, or high-grade plastic. As seen in FIGS. 1 and 2, each of the two barrels 112 lead to a respective photonic device 110. When one of photonic devices 110 transmits light signals and the other photonic device 110 receives light signals, plug device 100 can be used to channel the light signals from one photonic device to the other. In this way, one photonic device can be used to receive light signals from the other photonic device 110. In some embodiments, each photonic device 110 can send and receive light signals; therefore, each photonic device could send and receive light signals with the other photonic device.

In this testing mode, plug device 100 allows light signals to pass from one distal end of a rod 132, through handle 130, and to the distal end of the other rod 132. This path of light travel is diagrammatically shown by dashed lines 120 and 122 in FIG. 2.

By incorporating a self-test for a given module, it is possible to eliminate much of the costly optical components within a test system by providing an early "Go, No-Go" set of preliminary results. Ultimately, automation from assembly through test without operator handling can be realized. The Device Under Test (DUT) can reside within a socket on a fully electronic system, and characterized to calibrate the electronic behavior to optical behavior. Once in production, the device performance (both electrical and optical specifications) can be measured electrically directly from the chip package 104 and/or module electrical interface.

In the embodiment shown in FIG. 2, plug device 100 has beveled or angled surfaces 124 located at the ends of handle 130. Such angled surfaces 124 provide a reflective surface to facilitate the transmission of light through plug device 100. Angled surfaces 124 facilitate the transmission of light signals by reflecting the light from a rod 132 to travel through handle 130 and then through the length of the opposite rod 132. Angled surface 124 is shown to be at an angle of approximately 45-degrees with respect to the longitudinal axis of each rod 132. In alternative embodiments, angled surfaces 124 can be oriented at various angles depending upon the optical transmission requirements and characteristics of plug device 100.

In some embodiments, angled surfaces 124 can be covered with a reflective material such as a metal or a mirror to further increase the reflectivity of each surface. In other embodiments of plug device 100, the entire surface of plug device 100 can be covered with reflective material (except for the distal ends of rods 132 to allow for entry and exit of light signals). Such reflective material can be applied through various techniques such as sputtering.

Plug device can also be used for the purpose of transporting the OE device to which plug device is inserted. For instance, extension 136 provides a surface onto which a pick and place machine attach itself and thereby pick up plug device 100. Since rods 132 can fit snugly into barrels 112, an OE device can be picked up at the same time plug device 100 is picked up. This is advantageous since barrel units 108 do not typically have a surface onto which pick and place machines can easily attach themselves. Extension 136 has a flat surface 138 that allows a vacuum based pick and place machine to pick up plug device 100.

In some embodiments, an extension 136 need not extend out of handle 130 as shown in FIGS. 1 and 2. In these other embodiments, a flat surface can be created directly in handle 130.

Surface 138 can be various shapes that conform to a particular pick and place machine. In some embodiments, extension 136 can be shaped to make contact with a pick and place machine that uses a hook-type mechanism. It is noted that extension 136 and any type of surface amenable to pick and place machines is optional.

Figure 3:
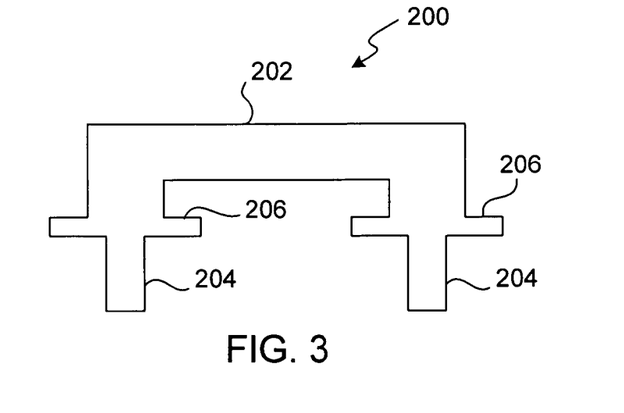
FIG. 3 illustrates a side plan view of a plug device according to an alternative embodiment of the invention.

FIG. 3 illustrates a side plan view of a plug device 200 according to an alternative embodiment of the invention. As with plug device 100, plug device 200 also has a handle 202, a pair of rods 204, and rims 206. Two main differences between plug device 200 and plug device 100 is that plug device 200 does not have angled surfaces at each end of handle 202 and there is no extension formed on handle 202. Even without angled surfaces on handle 202, plug device 200 is still capable of transmitting optical light signals through its interior structure. Of course, this requires that plug device 200 be made out of transparent or translucent material. As discussed earlier, an extension for pick and place purposes is optional. Alternatively, a surface suitable for pick and place machines can be formed directly on handle 202. For instance, a flat surface can be formed on handle 202 for vacuum devices to make contact with handle 202. As with plug device 100, reflective material can be applied to the surface of plug device 200 to varying extents.

Figure 4:
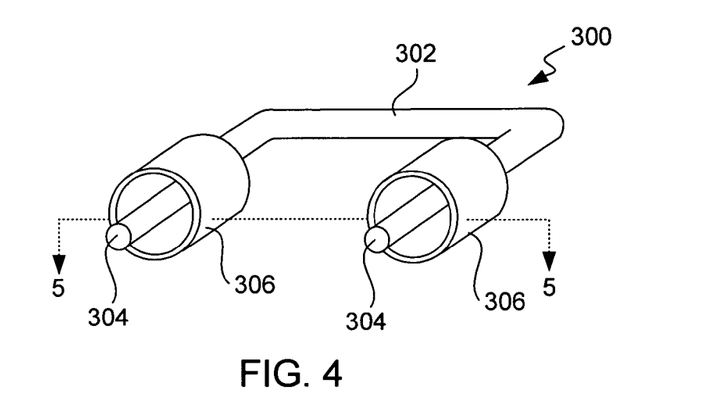
FIG. 4 illustrates a perspective view of a plug device according to an alternative embodiment of the invention.
Figure 5:
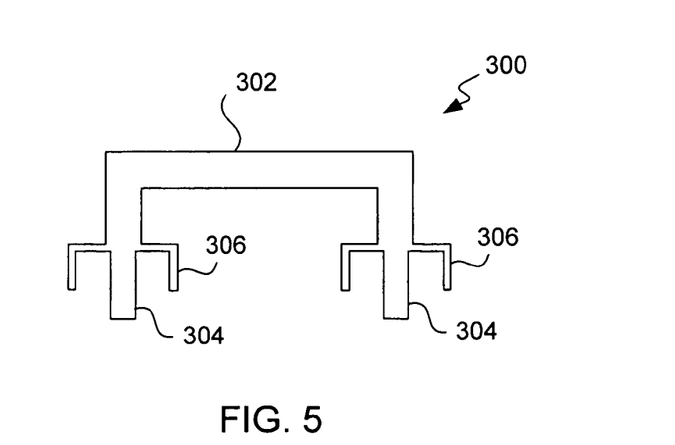
FIG. 5 illustrates a side plan, cross-sectional view of the plug device of FIG. 4 along line 5—5.

FIG. 4 illustrates a perspective view of a plug device 300 according to an alternative embodiment of the invention. FIG. 5 illustrates a side plan, cross-sectional view of plug device 300 along line 5—5. Plug device 300 also has a handle 302 and rods 304. In addition, plug device 300 also has tubes 306 that cover a portion of each rod 304. Tubes 306 are connected to rods 302 near the interface between handle 302 and each rod 304. Tubes 306 can be thought of as an extension of rims wherein a protective cover extends from the outer circumference of a rim. Tube 306 is useful when plug device 300 is attached to a barrel unit since each tube will cover a portion of the outer surface of a barrel. In this way, an even more complete seal around the opening of a barrel is achieved. The length of each tube 306 can vary depending upon the sealing requirements of an OE device manufacturing process. In one instance, each tube 306 can extend down the entire length of a barrel, while in another instance, each tube 306 may extend only a very small distance along a barrel.

In one embodiment, rods 304 are not required since each tube 306 can sufficiently seal an opening of a barrel. In other words, plug device 300 could have a handle 300, two tubes 306 extending from each end of handle 300, and no rods.

Plug device 300 can also be made out of material capable of transmitting optical signals and thereby provide the self-testing features discussed in this specification.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A plug device for use during the manufacture of optoelectronic devices comprising:
   a handle having a first end and a second end;
   a pair of rods wherein one of the rods extends from the first end of the handle and the other rod extends from the second end of the handle, wherein each of the rods is suitably sized to fit into respective barrels that lead to photonic devices such that each rod seals respective openings of the barrels and thereby prevents contaminating particles from entering each barrel, and wherein each of the rods are made of a material capable of transmitting optical light signals such that light entering a distal end of one of the rods can be transmitted through the handle and to a distal end of the other rod.

2. A plug device as recited in claim 1 wherein each of the rods are substantially parallel to each other.

3. A plug device as recited in claim 1 wherein each of the rods are integrally formed with the handle.

4. A plug device as recited in claim 1 further comprising:
   a rim that extends around each rod, wherein each rim further facilitates the sealing of an opening of a respective barrel.

5. A plug device as recited in claim 4 wherein each rim is farmed around each rod at a position near where the handle and a respective rod interface.

6. A plug device as recited in claim 5 wherein each rim has an outer circumference, each rim further comprising:
   a tube that extends from the outer circumference of each rim such that the tube surrounds at least a portion of each rod.

7. A plug device as recited in claim 4 further comprising:
   an optoelectronic device having two photonic devices and two hollow barrels wherein each hollow barrel is positioned above a respective photonic device, wherein each rod of the plug device is inserted into a respective barrel such that each rod seals an opening to each of the barrels and thereby prevents contaminating elements from entering the barrel.

8. A plug device as recited in claim 7 wherein each of the rods are substantially parallel to each other and each of the barrels are also substantiaUy parallel to each other.

9. A plug device as recited in claim 1 wherein an interior surface of the handle and each of the rods are covered with a reflective material chosen from among a metal or a mirror surface arranged so that the reflective material enhances the optical transmission capabilities of the plug device.

10. A plug device as recited in claim 9 wherein the first and second ends of the handle have an angled surface that facilitates light that travels through the plug device to pass from a rod to the handle, and vice-versa, by reflecting off of the angled surface.

11. A plug device as recited in claim 10 wherein each of the angled surfaces are at approximately a 45-degree angle with respect to the longitudinal axis of the rods.

12. A plug device as recited in claim 10 further comprising:
   a mirror attached to each of the angled surfaces to further facilitate the optical transmission of light through the plug device.

13. A plug device as recited in claim 11 wherein the first and second ends of the handle have an angled surface that facilitates light that travels through the plug device to pass from a rod to the handle, and vice-versa, by reflecting off of the angled surface.

14. A plug device as recited in claim 13 wherein each of the angled surfaces are covered with a reflective material, whereby the reflective material enhances the optical transmission capabilities of the plug device.

15. A plug device as recited in claim 1 further comprising:
   an optoelectronic device having two photonic devices and two hollow barrels wherein each hollow barrel is positioned above a respective photonic device, wherein each rod of the plug device is inserted into a respective barrel such that light signals emitted from each of the photonic devices can pass through the plug device and then be received by the other photonic device, whereby the plug device facilitates testing of the optoelectronic device.

16. A plug device as recited in claim 15 wherein the optoelectronic device is a transceiver.

17. A plug device as recited in claim 16 wherein to optoelectronic device is a multi-channel transceiver.

18. A plug device as recited in claim 1 wherein the handle has a flat surface suitable for a vacuum device to attach itself to the handle, whereby the vacuum device can then transport the plug device.

19. A plug device as recited in claim 18 wherein the flat surface is located on a surface of to handle that is opposite to the surface from which the rods extend.

20. A plug device as recited in claim 1 further comprising;
   a projection that extends from the handle on an opposite side of the handle from which the rods extend, the projection having a flat surface to which a vacuum device can attach itself, whereby the vacuum device can then transport the plug device.

21. A plug device for use during the manufacture of optoelectronic devices comprising:
   a handle having a fist end and a second end; and
   a pair of rods wherein one of the rods extends from the first end of the handle and the other rod extends from the second end of the handle, wherein each of the rods is suitably sized to fit into respective barrels that lead to photonic devices, and wherein each of the rods are made of a material capable of transmitting optical light signals such that light entering a distal end of one of the rods can be transmitted through the handle and to a distal end of the other rod and wherein the surface of the handle and each of the rods are covered with a reflective material arranged so that the reflective material enhances the optical transmission capabilities of the plug device.

22. A plug device as recited in claim 21 wherein the first and second ends of the handle have an angled surface that facilitates light that travels through the plug device to pass from a rod to the handle, and vice-versa, by reflecting off of the angled surface.

23. A plug device as recited in claim 22 wherein each of the angled surfaces are at approximately a 45 degree angle with respect to the longitudinal axis of the rods.

24. A plug device as recited in claim 22 further comprising:
a mirror attached to each of the angled surfaces to further facilitate the optical transmission of light through the plug device.

25. A plug device as recited in claim 21 further comprising:
an optoelectronic device having two photonic devices and two hollow barrels wherein each hollow barrel is positioned above a respective photonic device, wherein each rod of the plug device is inserted into a respective barrel such that light signals emitted from each of the photonic devices can pass through the plug device and then be received by the other photonic device, whereby the plug device facilitates testing of the optoelectronic device.

26. A plug device as recited in claim 21 wherein each rod is suitably sized to seal respective openings of the barrels and thereby prevent contaminating particles from entering each barrel.

27. A plug device as recited in claim 26 further comprising:
a rim that extends around each rod, wherein each rim further facilitates the sealing of an opening of a respective barrel.

28. A plug device as recited in claim 27 wherein each rim is formed around each rod at a position near the handle.

29. A plug device as recited in claim 21 wherein the handle has a flat surface suitable for a vacuum device to attach itself to the handle, whereby the vacuum device can then transport the plug device.

30. A plug device as recited in claim 29 wherein the flat surface is located on a surface of the handle that is opposite to the surface from which the rods extend.

31. A plug device as recited in claim 21 further comprising;
a projection that extends from the handle on an opposite side of the handle from which the rods extend, the projection having a flat surface to which a vacuum device can attach itself, whereby the vacuum device can then transport the plug device.

* * * * *

UNITED STATES PATENT AND TRADEMARK OFFICE
CERTIFICATE OF CORRECTION

| | | |
|---|---|---|
| PATENT NO. | : 6,985,668 B2 | Page 1 of 1 |
| APPLICATION NO. | : 10/621033 | |
| DATED | : January 10, 2006 | |
| INVENTOR(S) | : Mazotti et al. | |

It is certified that error appears in the above-identified patent and that said Letters Patent is hereby corrected as shown below:

In the Claims:

In line 2 of claim 5 (column 7, line 44) change "farmed" to --formed--.

In line 3 of claim 8 (column 7, line 62) change "substantiaUy" to --substantially--.

In line 1 of claim 13 (column 8, line 14) change "claim 11" to --claim 1--.

In line 1 of claim 17 (column 8, line 35) change "wherein to" to --wherein the--.

In line 2 of claim 19 (column 8, line 42) change "of to handle" to --of the handle--.

In line 3 of claim 21 (column 8, line 52) change "a fist end" to --a first end--.

Signed and Sealed this

Fifth Day of September, 2006

JON W. DUDAS
*Director of the United States Patent and Trademark Office*